United States Patent
Itou et al.

(10) Patent No.: US 9,625,772 B2
(45) Date of Patent: Apr. 18, 2017

(54) LIQUID CRYSTAL DISPLAY DEVICE

(71) Applicant: Japan Display Inc., Tokyo (JP)

(72) Inventors: Osamu Itou, Tokyo (JP); Takato Hiratsuka, Tokyo (JP); Toshimasa Ishigaki, Tokyo (JP); Daisuke Sonoda, Tokyo (JP)

(73) Assignee: Japan Display Inc., Tokyo (JP)

( * ) Notice: Subject to any disclaimer, the term of this patent is extended or adjusted under 35 U.S.C. 154(b) by 58 days.

(21) Appl. No.: 14/532,040

(22) Filed: Nov. 4, 2014

(65) Prior Publication Data

US 2015/0124209 A1 May 7, 2015

(30) Foreign Application Priority Data

Nov. 6, 2013 (JP) ................. 2013-230508

(51) Int. Cl.
*G02F 1/1343* (2006.01)
*G02F 1/1333* (2006.01)
*G02F 1/1337* (2006.01)

(52) U.S. Cl.
CPC .. *G02F 1/134363* (2013.01); *G02F 1/133377* (2013.01); *G02F 1/133707* (2013.01); *G02F 2001/133757* (2013.01)

(58) Field of Classification Search
CPC ......... G02F 1/133377; G02F 1/133707; G02F 1/134363; G02F 2001/133757
USPC ....................................................... 349/156
See application file for complete search history.

(56) References Cited

U.S. PATENT DOCUMENTS

| | | | |
|---|---|---|---|
| 5,852,485 A | 12/1998 | Shimada et al. | |
| 2003/0048401 A1* | 3/2003 | Hanaoka ........... | G02F 1/133753 349/123 |
| 2004/0212763 A1* | 10/2004 | Tsuchiya ........... | G02F 1/133753 349/114 |
| 2005/0046772 A1* | 3/2005 | Kubo ................. | G02F 1/133707 349/139 |
| 2006/0176430 A1* | 8/2006 | Sasaki ............... | G02F 1/133707 349/123 |
| 2007/0146568 A1* | 6/2007 | Yamazaki ........... | G02F 1/13394 349/43 |
| 2012/0026442 A1* | 2/2012 | Nakanishi ............ | C09K 19/322 349/123 |
| 2012/0262653 A1* | 10/2012 | Shimizu ............ | G02F 1/133707 349/106 |
| 2013/0135547 A1* | 5/2013 | Hibayashi .............. | G02B 5/201 349/33 |
| 2015/0085218 A1* | 3/2015 | Tomioka ........... | G02F 1/133707 349/42 |

FOREIGN PATENT DOCUMENTS

JP 9-258265 A 10/1997

* cited by examiner

*Primary Examiner* — Donald Raleigh
*Assistant Examiner* — Kevin Quarterman
(74) *Attorney, Agent, or Firm* — Typha IP LLC

(57) ABSTRACT

In an LCD device, the slope angle of a wall surface of a wall structure (wall-surface slope angle) is varied in accordance with the angle formed between the wall structure and an alignment treatment direction (alignment treatment angle). At places where the alignment treatment angle is small, the wall-surface slope angle is made larger; conversely, at places where the alignment treatment angle is large, the wall-surface slope angle is made smaller.

4 Claims, 18 Drawing Sheets

F I G . 5
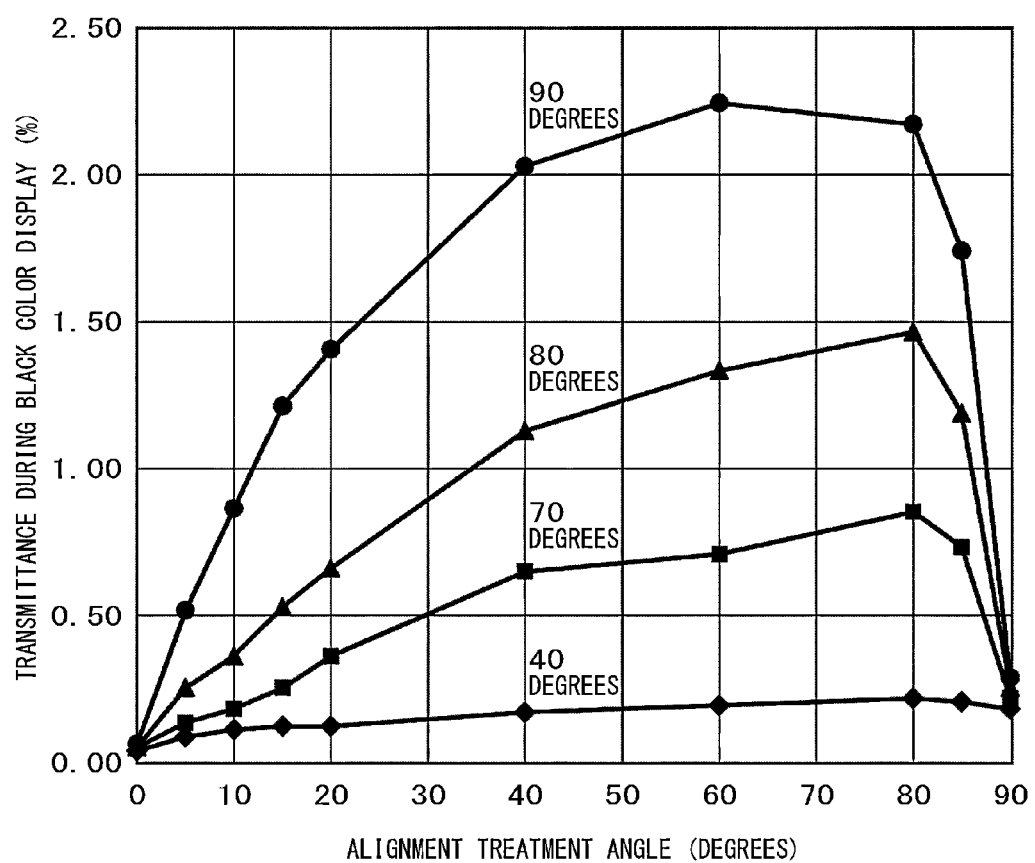

LIQUID CRYSTAL DISPLAY DEVICE

CLAIM OF PRIORITY

The present application claims priority from Japanese patent application JP2013-230508 filed on Nov. 6, 2013, the content of which is hereby incorporated by reference into this application.

BACKGROUND

The present invention relates to liquid crystal display devices and is applicable, for example, to a liquid crystal display device having wall electrodes.

A liquid crystal display (LCD) device is a non-luminescent display that shows images by controlling transmissive light from a light source. The main features of LCDs include thinness, light weight, and low power consumption. At present, in-plane switching (IPS) can be given as an example of liquid crystal display schemes that achieve wide viewing angles. An IPS LCD includes source electrodes and a common electrode on a TFT substrate, and application of a lateral electric field to each pixel causes the liquid crystal molecules to rotate in an in-plane direction. This in turn causes the effective optical axis to rotate in one plane, whereby transmittance can be controlled.

JP-1997-258265-A discloses an LCD device that aims to achieve a sufficient aperture ratio, reduce inter-wiring noise signals, and apply to the liquid crystal layer uniform lateral electric fields that are almost completely parallel to the substrate surface. In the above LCD device, drain electrodes and opposite electrodes protrude into the liquid crystal layer to apply electric fields to the liquid crystal layer.

SUMMARY

As described below, the present inventors have found problems with the electrode structure of IPS LCDs.

An electrode that has substantially the same height as the thickness of a liquid crystal layer and protrudes into the layer is hereinafter referred to as a wall electrode. In an IPS LCD with such wall electrodes, electric fields are applied parallel to the entire liquid crystal layer. Thus, the transmittance of such an IPS LCD is higher than that of a conventional IPS LCD in which planner electrodes are used to apply lateral electric fields only to the bottom section of the liquid crystal layer.

However, light may occasionally be transmitted at nearby sections of the wall electrodes even when no voltage is applied. This phenomenon is called light leakage. With an IPS LCD having wall electrodes, this light leakage leads to a lower contrast ratio.

Other problems to be solved by the present invention as well as its novel features will be understood from the following disclosure and the attached drawings.

The representative feature of the present invention can be summarized as follows.

In an LCD device, the slope angle of a wall surface of a wall structure (wall-surface slope angle) is varied in accordance with the angle formed between the wall structure and an alignment treatment direction (alignment treatment angle). At areas where the alignment treatment angle is small, the wall-surface slope angle is made larger; conversely, at places where the alignment treatment angle is large, the wall-surface slope angle is made smaller.

The above LCD device is capable of reducing light leakage at nearby sections of the wall electrodes and achieving a higher transmittance rate as well.

BRIEF DESCRIPTION OF THE DRAWINGS

FIG. 5 is a graph illustrating the dependence of light leakage on an alignment treatment angle and a wall-surface slope angle.

DESCRIPTION OF THE PREFERRED EMBODIMENTS

Figure 19A:
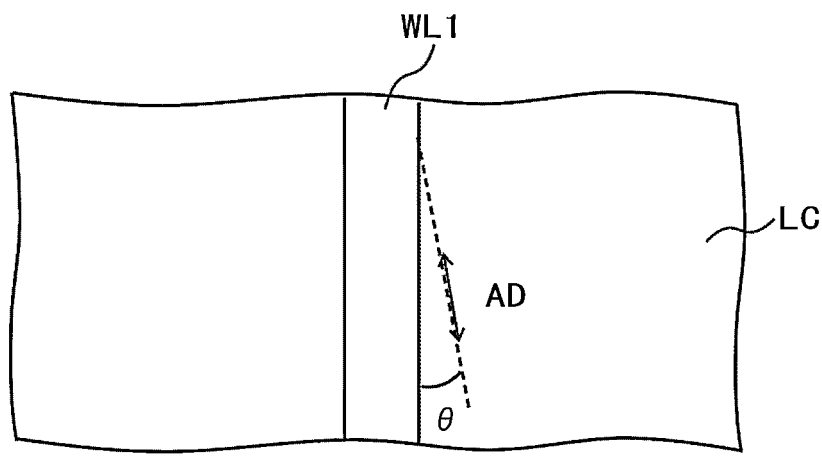
FIGS. 19A and 19B illustrate the structure of an IPS LCD with wall electrodes.
Figure 19B:
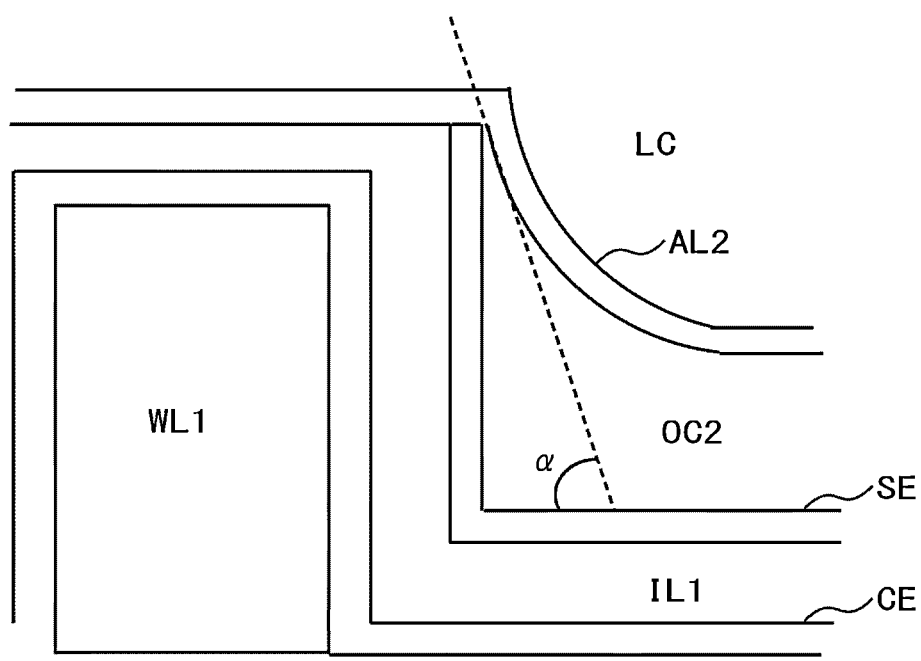

FIGS. 19A and 19B illustrate the structure of an IPS LCD with wall electrodes; they are a plan view and a cross section, respectively, of its essential part. A first wall structure WL1 extends into a liquid crystal layer LC, and a common electrode CE is formed on the top and side surfaces and the like of the first wall structure WL1. Also, a source electrode SE is formed over the side surfaces and the like of the first wall structure WL1 via the common electrode CE and a first insulating film ILL and a second overcoat OC2 is formed on the source electrode SE. The liquid crystal layer LC is formed over the second overcoat OC2 with a second alignment film AL2 placed therebetween.

Figure 4:
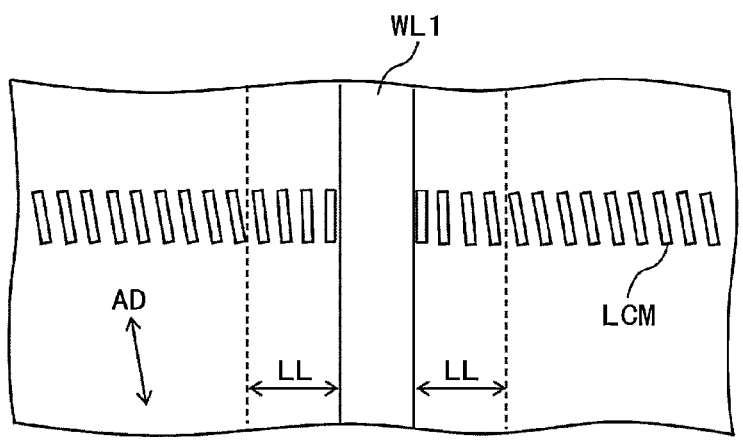
FIG. 4 is a plan view illustrating a first wall structure and nearby liquid crystal molecules.

FIG. 4 depicts the alignment of the liquid crystal molecules of FIG. 19A. In an IPS LCD having wall electrodes, light may occasionally be transmitted at the wall surfaces of wall structures and at nearby sections of the liquid crystal layer, which results in increased transmittance during black-color display. This phenomenon is called light leakage. Light leakage areas are also illustrated in FIG. 4 together with the alignment of nearby liquid crystal molecules. FIG. 4 is a plan view illustrating a single first wall structure WL1 and nearby liquid crystal molecules LCM, and the light leakage areas, designated by LL, are the regions between the first wall structure WL1 and the dashed lines. The illustrated alignment directions of the liquid crystal molecules LCM are the local alignment directions within the liquid crystal layer LC. As illustrated in FIG. 4, the alignment directions of the liquid crystal molecules LCM in the light leakage areas LL become more parallel to the wall surfaces of the first wall structure WL1 as the molecules LCM get closer to the wall surfaces. The absorption axes of the first polarizer PL1 and the second polarizer PL2 of the above IPS LCD are perpendicular to each other, with one being parallel to an alignment treatment direction AD and the other being perpendicular to it. For this reason, deviation of the alignment directions from the alignment treatment direction AD results in increased transmittance during black-color display, which is observed as light leakage. In other words, light leakage is caused by changes of the alignment directions of the liquid crystal molecules from the alignment treatment direction AD.

FIG. 19A further illustrates an alignment treatment angle while FIG. 19B illustrates a wall-surface slope angle. As illustrated in FIGS. 19A and 19B, the alignment treatment angle ($\theta$) is defined as the angle formed between the alignment treatment direction AD determined by alignment treatment and one wall surface of the wall structure, and the wall-surface slope angle ($\alpha$) as the slope angle of one wall surface of the wall structure. Light leakage is dependent on these following angles: the alignment treatment angle and the wall-surface slope angle. Note however that a typical wall structure is not trapezoid-shaped in cross section, and the slope angle of its wall surface has a distribution. Thus, by the wall-surface slope angle ($\alpha$), we mean the maximum value of the distribution.

To clarify the dependence of light leakage on the alignment treatment angle and the wall-surface slope angle, we created a simulated wall structure and measured the transmittance rate while varying the alignment treatment angle ($\theta$) and the wall-surface slope angle ($\alpha$). The simulated wall structure was formed by first wall structures WL1 and second overcoats OC2 that filled the spaces between the first wall structures WL1. The first wall structures WL1 were each 4-$\mu$m wide and arranged at 20-$\mu$m intervals. Each of the first wall structures WL1 was square-shaped in cross section, and the wall-surface slope angle ($\alpha$) was varied by changing the shape of the second overcoats OC2. Also, a pair of polarizing plates was formed on and beneath the liquid crystal cell having the simulated wall structure, the absorption axis of one of which was configured to be parallel to the alignment treatment direction while that of the other was configured to be perpendicular to it. FIG. 5 illustrates the dependence of light leakage on the alignment treatment angle and the wall-surface slope angle. In FIG. 5, the vertical axis represents transmittance during black-color display or the intensity of light leakage while the horizontal axis represents the alignment treatment angle ($\theta$). The plotted curves of FIG. 5 were obtained when the wall-surface slope angle ($\alpha$) was 40, 70, 80, and 90 degrees. As illustrated, when the wall-surface slope angle ($\alpha$) is 40 degrees, the black-color display transmittance increases slightly with an increase in the alignment treatment angle ($\theta$) and is the largest when the alignment treatment angle ($\theta$) is 85 degrees or thereabout. When the alignment treatment angle ($\theta$) exceeds 85 degrees, the transmittance decreases drastically. For instance, when the alignment treatment angle ($\theta$) is 90 degrees, the transmittance takes substantially the same value as that obtained when the alignment treatment angle ($\theta$) is 0 degrees. The same is true when the wall-surface slope angle ($\alpha$) is 70 and 80 degrees, except that the transmittance increases more drastically with an increase in the alignment treatment angle ($\theta$). The above is also true when the wall-surface slope angle ($\alpha$) is 90 degrees, except that the transmittance is largest when the alignment treatment angle ($\theta$) is 60 degrees. As also can be seen, a plotted curve of a larger wall-surface slope angle ($\alpha$) is located at a more upward position in the graph. In summary, light leakage tends to be greater with increases in the alignment treatment angle ($\theta$) and the wall-surface slope angle ($\alpha$). Moreover, when the alignment treatment angle ($\theta$) is small, increasing the wall-surface slope angle ($\alpha$) can still reduce light leakage. Conversely, when the alignment treatment angle ($\theta$) is large, reducing the wall-surface slope angle ($\alpha$) can diminish light leakage.

While FIG. 5 illustrates the general tendency of the black-color display transmittance to be greater with an increase in the alignment treatment angle ($\theta$), this can also be explained from the liquid crystal alignment within the light leakage areas LL illustrated in FIG. 4. As can been seen in FIG. 4, the alignment directions of those liquid crystal molecules LCM located near the first wall structure WL1 become more parallel to the wall surfaces of the first wall structure WL1 as the molecules LCM get closer to the wall surfaces. Thus, the larger the alignment treatment angle ($\theta$) is, the lager the angles at which the liquid crystal molecules can move. As changes of the liquid crystal alignment directions are greater, the intensity of light leakage per unit area increases accordingly. Moreover, since the liquid crystal layer LC of each pixel has elastic properties, changes of alignment directions occurring near a first wall structure WL1 will propagate to nearby sections of the liquid crystal layer LC. As those changes are larger, they will propagate to farther areas, which increases the area where alignment changes occur (i.e., leads to wider light leakage areas LL). Therefore, an increase in the alignment treatment angle ($\theta$) leads to rises both in the intensity of light leakage per unit area and in the light leakage areas LL and consequently boosts light leakage. In addition, while FIG. 5 reveals that the transmittance during black-color display decreases when the alignment treatment angle ($\theta$) is 90 degrees, this can also be explained as follows. When the alignment treatment angle ($\theta$) is about 90 degrees, the clockwise rotation of a liquid crystal molecule LCM to become parallel to a wall surface is balanced by the counterclockwise rotation of the molecule LCM to become parallel to the wall surface. As a result, the alignment direction of the liquid crystal molecule LCM does not change.

In an IPS LCD having wall electrodes, each wall electrode is disposed at a pixel boundary section and includes a portion parallel to the long side of a pixel and another portion parallel to the short side of the pixel. The former portion is hereinafter referred to as a liquid crystal driver unit and the latter as a domain controller unit. A domain is an area that exhibits the liquid crystal rotational direction opposite to the rotational direction of those liquid crystal molecules LCM located at the center of a pixel when a voltage is applied. When a domain occurs at the edge of a pixel, the clockwise liquid crystal rotation is balanced by the counterclockwise liquid crystal rotation, causing the pixel to have areas where no alignment changes occur. Such areas with no alignment changes are observed as black lines and lead to reduced transmittance since the areas have the same alignment status as that occurring during black-color display. Thus, the domain controller unit is used to prevent such domain occurrence, thereby improving transmittance. In other words, with an IPS LCD having wall electrodes, each wall electrode requires a liquid crystal driver unit and a domain controller unit that extends in a direction perpendicular to the driver unit.

As stated above, the size of a light leakage area depends on the alignment treatment angle. A light leakage area becomes particularly large when the alignment treatment angle is in the range of 15 to 88 degrees, reaching an area farther away from a wall structure. However, when the alignment treatment angle is 0 or 90 degrees, light leakage can be suppressed sufficiently.

Near the liquid crystal driver unit, the alignment treatment angle is small and out of the above range (e.g., 5 degrees); thus, a light leakage area occurs only near the wall structure and can be masked by a black matrix. Near the domain controller unit, however, the alignment treatment angle is, for example, 85 degrees and lies within the above range. The domain controller unit is disposed on part of one short side of a pixel so that it does not interrupt the flow of liquid crystals at the time of forming the liquid crystal layer. However, the distal end of the domain controller unit is hemisphere-shaped due to the resolution of photolithography. Therefore, around the hemispherical end, the alignment treatment angle lies mostly within the above range. As above, a wide light leakage area occurs around the domain controller unit, and masking that wide light leakage area with a black matrix would result in a reduced aperture ratio.

Factors causing light leakage include both the alignment treatment angle and the wall-surface slope angle. Thus, when the alignment treatment angle is 10 degrees or thereabout, light leakage can be prevented by reducing the wall-surface slope angle to 70 degrees or less. Meanwhile, when the wall-surface slope angle falls well below 70 degrees, the LC layer thickness near the wall electrode will decrease, resulting in a lower transmittance rate. Thus, in order to reduce light leakage without compromising transmittance, the wall-surface slope angle needs to be in a desired range.

To achieve the desired range, the wall-surface slope angle is varied at the domain controller unit and at the liquid crystal driver unit. For example, the wall-surface slope angle is set to less than 70 degrees for the former and 70 degrees or above for the latter. These wall-surface slope angles can be achieved by varying the thickness of an organic insulating film applied onto the spaces between wall structures. More specifically, the thickness of the insulating film covering the wall surfaces of the wall structures is made larger near the domain controller units and smaller near the liquid crystal driver units.

Each domain controller unit is disposed on one short side of a pixel. Two wall surfaces of the domain controller unit each exercise domain control on two adjacent pixels.

The factors causing light leakage include the alignment treatment angle and the wall-surface slope angle, and the size of a light leakage area increases with development in the alignment treatment angle and the wall-surface slope angle. The wall-surface thickness distribution of a wall structure is determined by its primary functions, that is, application of electric fields to the liquid crystal layer and domain control. And its liquid crystal driver unit is disposed parallel to the long side of a pixel with its domain controller unit provided parallel to the short side of the pixel. When the alignment treatment direction is set such that it is constant across the entire surface of the pixel, and the liquid crystal molecules have a positive dielectric anisotropy, application of an electric field causes the molecules to rotate such that their alignment directions become more parallel to the electric force lines. To increase the rotational angles of the liquid crystal molecules and thereby increase transmittance, the alignment treatment direction is determined such that the alignment treatment angle is smaller near the liquid crystal driver unit. As a result, the alignment treatment angle becomes larger near the domain controller unit.

Since the alignment treatment angle is small near the liquid crystal driver unit, the wall-surface slope angle is set to 70 degrees or bigger near the liquid crystal driver unit. On the contrary, the wall-surface slope angle is set to less than 70 degrees (e.g., 50 degrees) since the alignment treatment angle is large near the domain controller unit. By doing so, a sufficiently thick liquid crystal layer can be secured near the liquid crystal driver unit, leading to a higher transmittance rate. Also, setting the wall-surface slope angle to less than 70 degrees near the domain controller unit, around which the alignment treatment angle is large, can prevent the occurrence of light leakage near the domain controller unit.

Each wall structure itself is substantially square-shaped in cross section, and the wall-surface slope angle is controlled by varying the thickness distribution of the organic insulating film applied to the inter-wall-structure spaces. Specifically, when the thickness of the insulating film is made uniformly smaller than the wall structure, the outline of the wall structure is exposed, and the wall-surface slope angle thus gets closer to 90 degrees. On the other hand, if the thickness of the insulating film has a distribution such that the insulating film is thicker near the wall structure and thinner away from it, the wall surface can be covered sufficiently with the insulating film, reducing the wall-surface slope angle to less than 90 degrees.

Although the thickness of the liquid crystal layer is smaller near the domain controller units, disposing a single domain controller unit on a short side of a pixel allows formation of opaque layers of a gate line and the like near the domain controller unit. Because these opaque layers constitute a non-aperture section, transmittance will not decline around the domain controller unit. It should be noted that two wall surfaces of the domain controller unit each exercise domain control on two adjacent pixels. Also, as stated above, the wall-surface slope angle around the domain controller unit can be reduced by varying the thickness of the insulating film covering the wall structure. Thus, the slope angle of the electrode of the wall structure is constant. This means that reducing the wall-surface slope angle has less influence on the distribution of an electric field, and the domain control functions of the domain controller unit can be maintained.

When a single domain controller unit is disposed on a pixel boundary on a short side of a pixel, a contact hole will need to be provided between two opposing wall electrodes. At this time, electric force lines can be formed over the contact hole and the nearby areas thereof, thereby driving liquid crystal molecules around the contact hole. Thus, in accordance with the present embodiment, the effective aperture ratio of an LCD device can be improved as well.

Example 1

Figure 1:
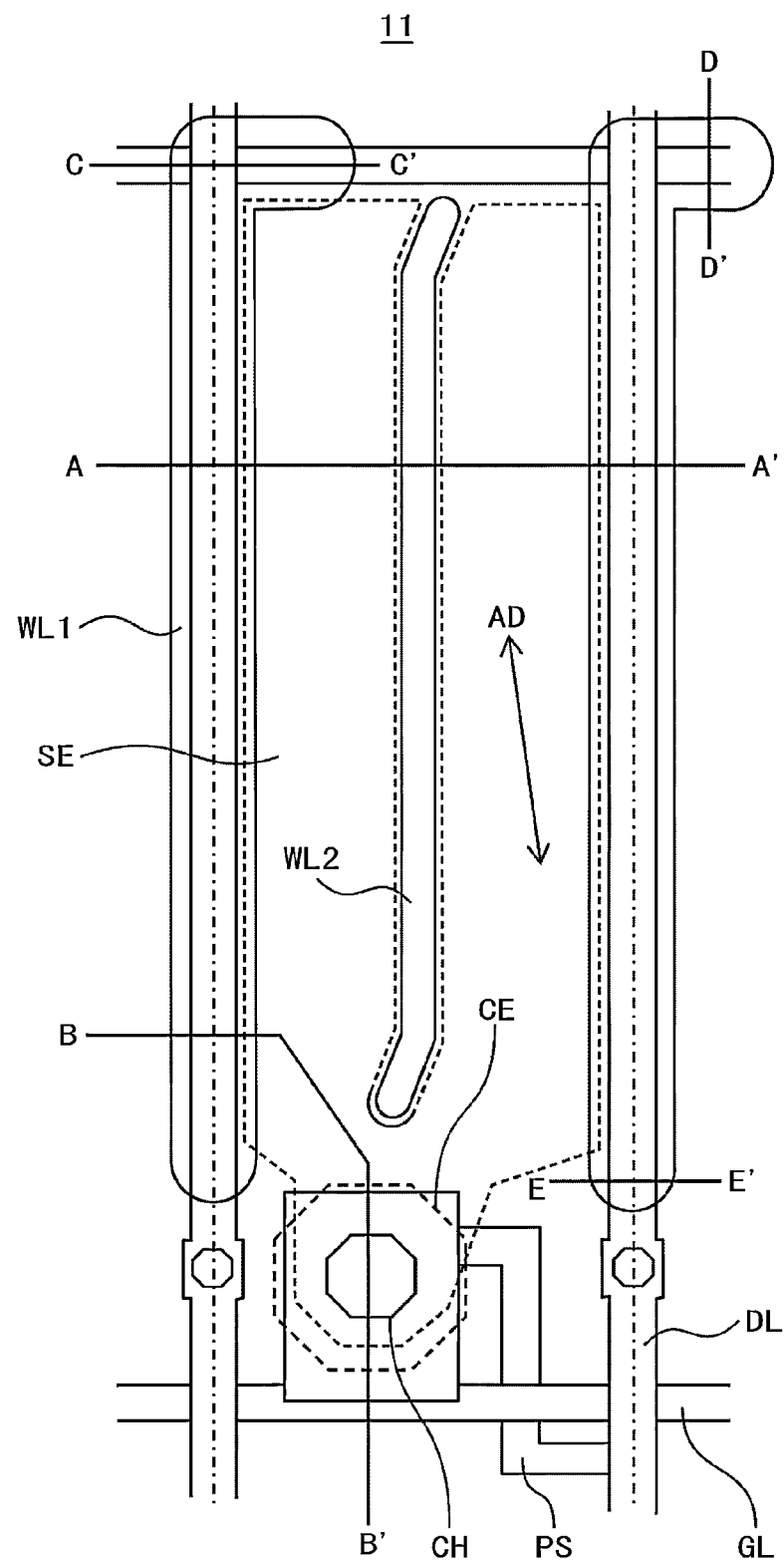
FIG. 1 is a plan view of one pixel of an LCD device according to Example 1 of the invention.
Figure 2:
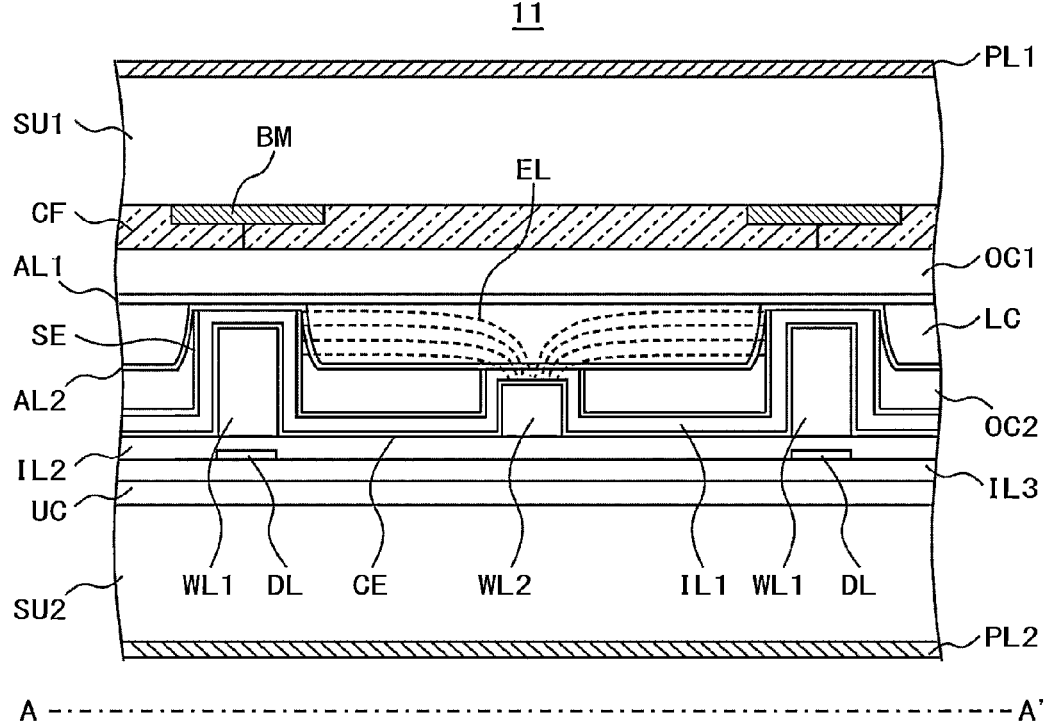
FIG. 2 is a cross section taken along line A-A' of FIG. 1.
Figure 3:
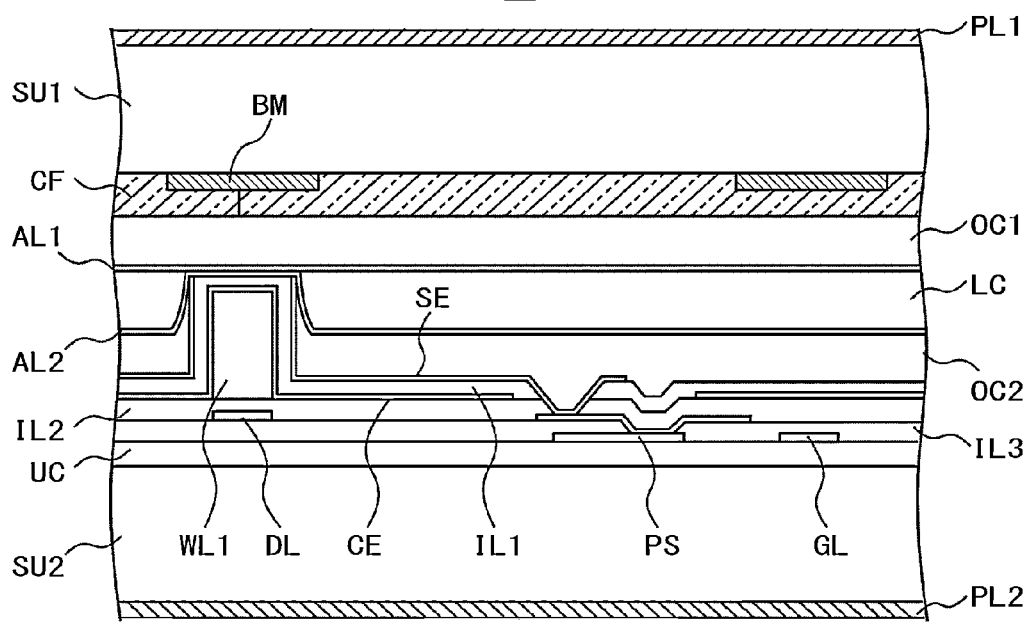
FIG. 3 is a cross section taken along line B-B' of FIG. 1.

FIG. 1 is a plan view illustrating one pixel of an LCD device according to Example 1 of the invention. FIG. 2 is a cross section taken along line A-A' of FIG. 1, and FIG. 3 is a cross section taken along line B-B' of FIG. 1. The LCD device of Example 1, designated by 11, is an IPS LCD with wall electrodes. The LCD device 11 includes a first substrate SU1 and a second substrate SU2 with a liquid crystal layer LC placed therebetween. Laminated structures on the first substrate SU1 include, from the liquid crystal layer side, a first alignment film AL1, a first overcoat OC1, a color filter CF, and a black matrix BM. The color filter CF includes red, green, and blue color filters, each of which is strip-shaped and arranged to cover one pixel. Laminated structures on the second substrate SU2 include the following components from the liquid crystal layer side: a second alignment film AL2, a second overcoat OC2, source electrodes SE, a first insulating film IL1 a common electrode CE, first wall structures WL1, second wall structures WL2, a second insulating film IL2, data lines DL, a third insulating film IL3, gate lines GL, a polysilicon layer PS, and an undercoat UC.

The dashed lines of FIG. 1 represent the outlines of a source electrode SE and the common electrode CE. Because the common electrode CE extends across the entire surface of FIG. 1 except the contact hole CH, the dashed outline of the common electrode CE is present only around the contract hole CH.

The first wall structures WL1 are larger in height than the second wall structures WL2 and extend into the liquid crystal layer LC. The second wall structures WL2 are covered with the second overcoat OC2, with only their top portions appearing on the second overcoat OC2. The common electrode CE extends over the first and second wall structures WL1 and WL2 and across the spaces between the wall structures. The source electrodes SE, meanwhile, extend over the wall surfaces of the first wall structures WL1, over the proximal portions of the second wall structures WL2, and across the spaces between the wall structures WL1 and WL2. The common electrode CE and the source electrodes SE are laminated together with the first insulating film IL1 placed therebetween, and the laminated portions function as storage capacitors. As stated above, the common electrode CE extends not only over the first and second wall structures WL1 and WL2 but also across the spaces between the wall structures; thus, it is capable of blocking off the influence of the electric potential of adjacent pixels and wiring.

The source electrodes SE are each connected to a data line DL via the polysilicon layer PS and a contact hole CH, and a voltage is applied to the liquid crystal layer LC based on an image signal. The common electrode CE has an opening around each contact hole CH to prevent a short circuit with the source electrodes SE. The dashed lines of FIG. 2 represent electric force lines EL formed between a source electrode SE and the common electrode CE. As illustrated, the electric force lines EL are distributed so as to connect the source electrode SE on the wall surfaces and the common electrode CE exposed at the center of the pixel. Thus, within the liquid crystal layer LC, the electric force lines EL run substantially parallel to a flat surface of the liquid crystal layer LC except above the second wall structures WL2.

The liquid crystal layer LC exhibits a nematic phase within a wide temperature range including a room temperature. When no voltage is applied to the liquid crystal layer LC, the liquid crystal molecules are homogeneously aligned. On the other hand, application of an electric field causes the liquid crystal director to change in such a manner the director rotates within the liquid crystal layer. In a conventional IPS LCD with a planar common electrode CE and source electrodes SE, electric fields are locally present at electrode boundaries. In contrast, the LCD device of Example 1 allows application of more uniform electric fields to the liquid crystal layer LC, whereby higher transmittance can be achieved. Since the liquid crystal layer LC is not present at the places where the first wall structures WL1 are present, the places constituting non-aperture sections. Also, the first wall structures WL1 are formed mainly at pixel boundary sections, which are light-blocked by the black matrices BM. Therefore, the presence of the first wall structures WL1 hardly reduces the aperture ratio. The first alignment film AL1 and the second alignment film AL2 are photo-alignment films, and a photo-alignment method is employed for their alignment treatment. After being applied onto the first wall structures WL1, the second alignment film AL2 is subjected to non-contact alignment treatment with the use of polarized ultraviolet light.

As illustrated in FIG. 1, each of the first wall structures WL1 is L-shaped in plan view, and the first wall structure WL1 of one pixel is disconnected and separated from those of adjacent pixels. At the time the liquid crystal layer is formed, such an arrangement allows liquid crystal molecules to flow along the space between the first wall structures WL1. Thus, the separate arrangement of the first wall structures WL1 enables easy formation of the liquid crystal layer LC.

Figure 6A:
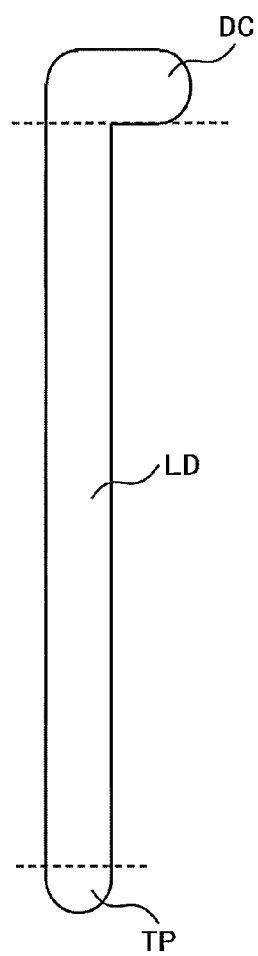
FIG. 6A is a plan view illustrating one of the first wall structures of FIG. 1.

FIG. 6A depicts one of the first wall structures WL1 of FIG. 1. The wall surfaces of the first wall structure WL1 face different directions at a liquid crystal driver unit LD, a distal end TP, and a domain controller unit DC. While FIG. 6B also illustrates the alignment treatment direction AD, this means that the alignment treatment angle (θ) differs at the liquid crystal driver unit LD, the distal end TP, and the domain controller unit DC. Specifically, because the wall surfaces of the liquid crystal driver unit LD is more parallel to the alignment treatment direction AD, the alignment treatment angle (θ) is smaller near the liquid crystal driver unit. In contrast, near the distal end TP and the domain controller unit DC, the directions of their wall surfaces deviate considerably from a direction parallel to the alignment treatment direction AD; thus, the alignment treatment angle (θ) is larger near those areas. Therefore, to suppress light leakage, the wall-surface slope angle (α) should be made larger near the liquid crystal driver unit LD and smaller near the distal end TP and the domain controller unit DC. More specifically, the wall-surface slope angle (α) should be set to 40 degrees or less near the distal end TP and the domain controller unit DC because FIG. 5 reveals that transmittance during black-color display increases only a little when the wall-surface slope angle (α) is 40 degrees.

Figure 7:
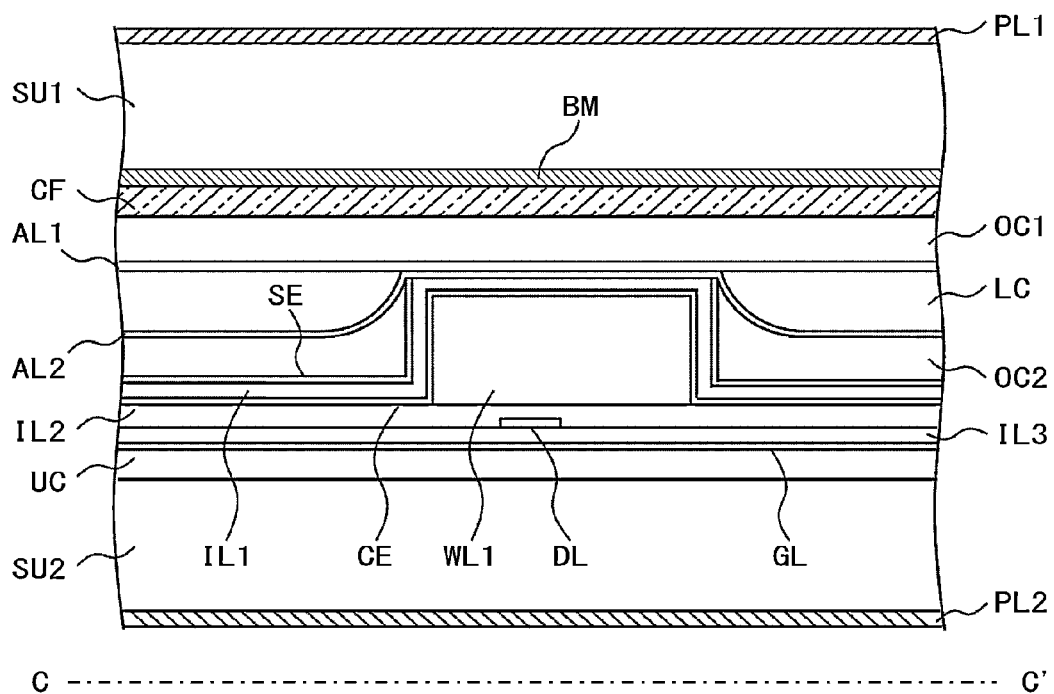
FIG. 7 is a cross section taken along line C-C' of FIG. 1.
Figure 8:
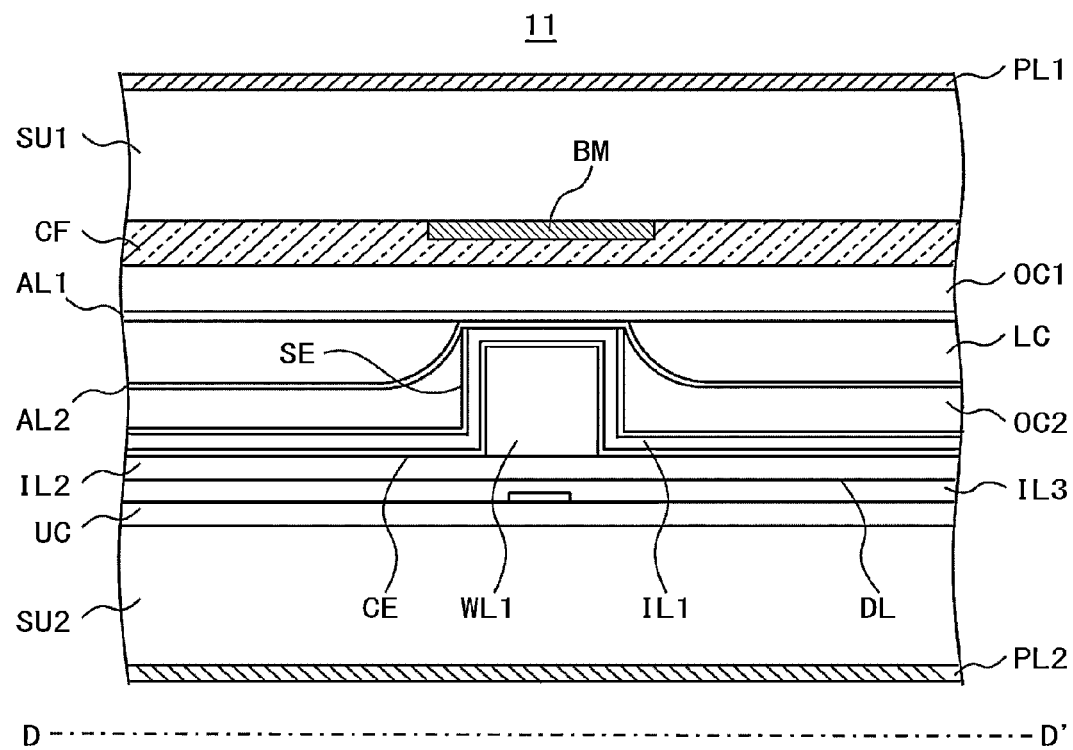
FIG. 8 is a cross section taken along line D-D' of FIG. 1.
Figure 9:
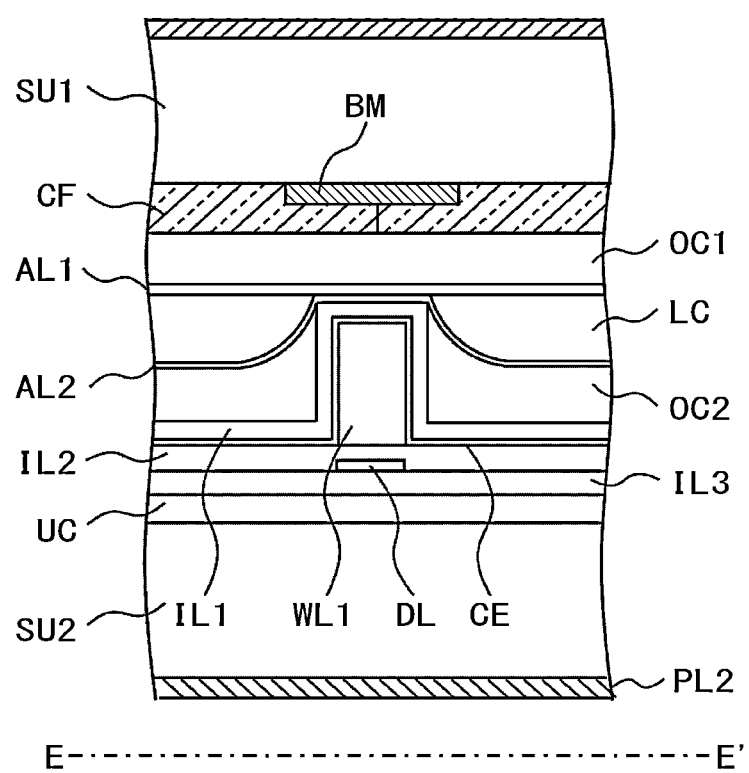
FIG. 9 is a cross section taken along line E-E' of FIG. 1.

On the basis of the findings obtained from our experiments using a simulated wall structure in FIG. 5, the wall-surface slope angle of a first wall structure WL1 within a pixel is determined as illustrated in FIGS. 1, 7, 8, and 9. The wall-surface slope angle (α) is set to 70 degrees near the liquid crystal driver unit LD since the alignment treatment angle (θ) is constantly small (5 degrees) near the liquid crystal driver unit LD (See also FIGS. 2 and 3, which are cross sections illustrating the liquid crystal driver unit LD of the first wall structure WL1). FIGS. 7 and 8 are respectively cross sections taken along lines C-C' and D-D' of FIG. 1, illustrating the domain controller unit DC. The cross section of FIG. 7 is parallel to a drain line DL while that of FIG. 8 is parallel to a gate line GL. Because the alignment treatment angle (θ) near the domain controller unit DC has a value distribution in which some angle values are high, the wall-surface slope angle (α) is set to 40 degrees near that unit DC. FIG. 9 is a cross section taken along line E-E' of FIG. 1, illustrating the distal end TP. Similar to the domain controller unit DC, the alignment treatment angle (θ) is also high at some points around the distal end TP; thus, the wall-surface slope angle (α) is set to 40 degrees near the distal end TP.

Figure 6B:
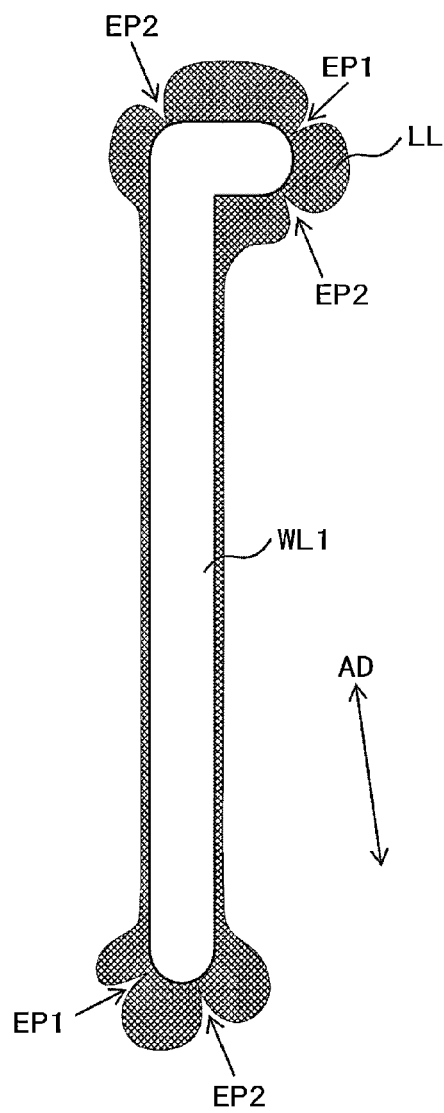
FIG. 6B is a diagram illustrating the light leakage according to Comparative Example 1.
Figure 6C:
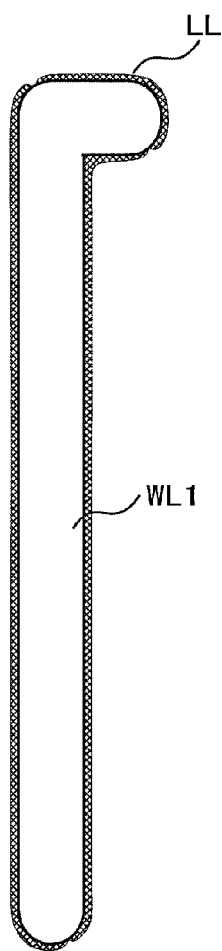
FIG. 6C is a diagram illustrating the light leakage according to Example 1.

FIG. 6C illustrates the light leakage resulting from the above angle setting. FIG. 6C was obtained by observing the first wall structure WL1 by use of an optical microscope. In the figure, the bold line represents the outline of the first wall structure WL1 while the hatched areas represent the light leakage areas LL around it. As illustrated, the light leakage areas LL are considerably small around any of the liquid crystal driver unit LD, the distal end TP, and the domain controller unit DC, and light leakage is controlled sufficiently. Such small light leakage areas can be masked with a black matrix BM. This masking will reduce transmittance during black-color display and lead to a higher contrast ratio. When an image is displayed, the black color becomes darker, and color representation becomes more vivid.

Comparative Example 1

Figure 15:
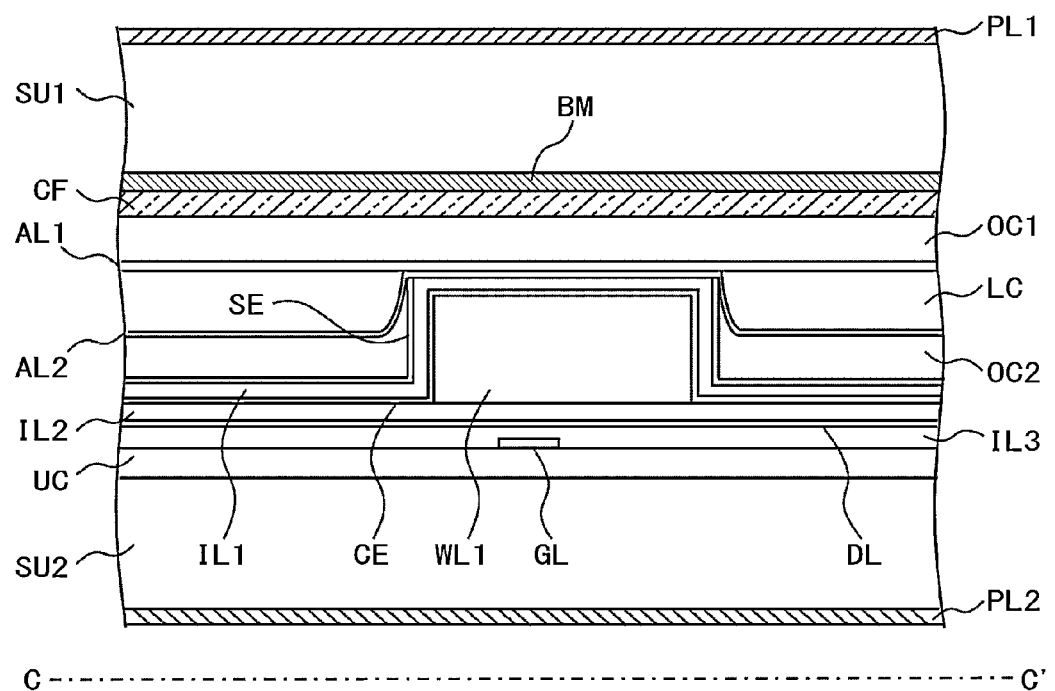
FIG. 15 is a C-C' cross section of a pixel of an LCD device according to Comparative Example 1.
Figure 16:
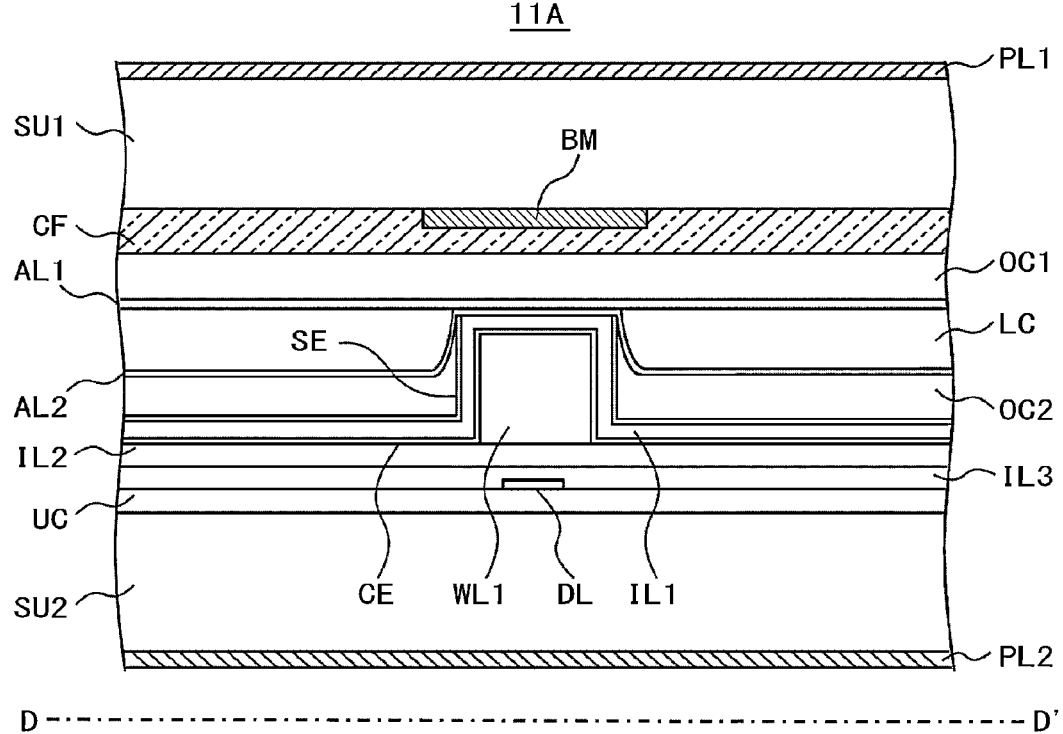
FIG. 16 is a D-D' cross section of a pixel of the LCD device of Comparative Example 1.
Figure 17:
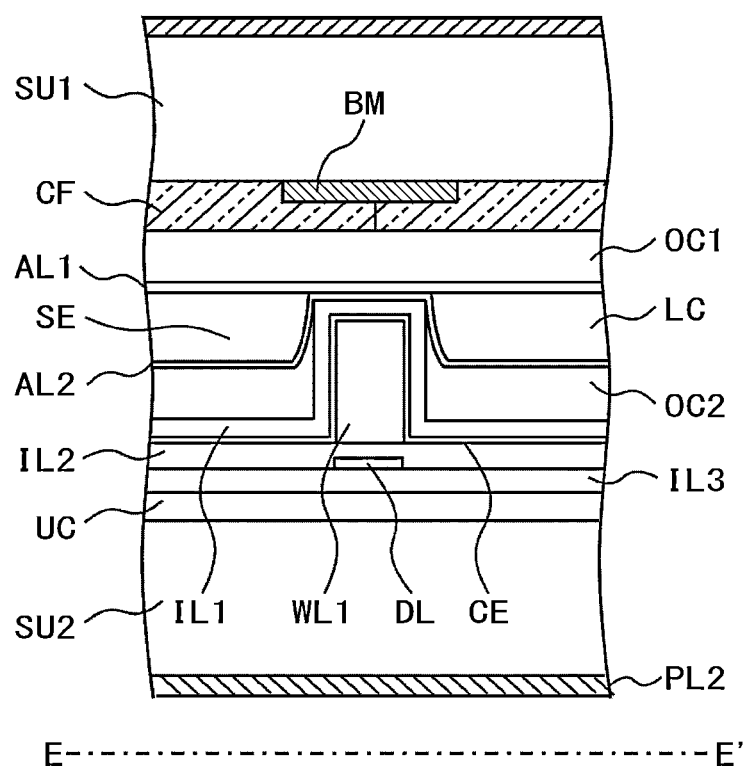
FIG. 17 is an E-E' cross section of a pixel of the LCD device of Comparative Example 1.

In the LCD device of Example 1, the wall-surface slope angle was configured to be constant (70 degrees) within each pixel. As illustrated in FIGS. 15, 16, and 17, the wall-surface slope angle was increased near the domain controller unit DC and the distal end TP so that the wall-surface slope angle was the same around all of the liquid crystal driver unit LD, the domain controller unit DC, and the distal end TP. FIG. 6B illustrates the resultant light leakage. As illustrated, the light leakage areas LL near the liquid crystal driver unit LD are small; however, the light leakage areas LL around the distal end TP and the domain controller unit DC spread significantly widely.

FIG. 6B also illustrates first quencher units EP1 and second quencher units EP2. Near those units, the light leakage areas LL shrink partially. This is because the alignment treatment angle is 90 degrees near the first quencher units EP1 and 0 degrees near the second quencher units EP2. In addition, as illustrated in FIG. 5, when the alignment treatment angle is 90 or 0 degrees, the light leakage is suppressed considerably.

Unlike Example 1 and Example 2 to be described later, the wall-surface slope angle was configured to be constant within each pixel regardless of the alignment treatment angle. Specifically, the wall-surface slope angle was set to 70 degrees, a relatively large value, even in areas where the alignment treatment angle is large. Therefore, light leakage was not prevented near the distal end TP and the domain controller unit DC of each first wall structure WL1. The light leakage areas LL was not fully masked by the black matrices BM, and transmittance during black-color display was thereby greater. As a result, the contrast ratio decreased, and vivid color representation was not achieved.

Comparative Example 2

Figure 18:
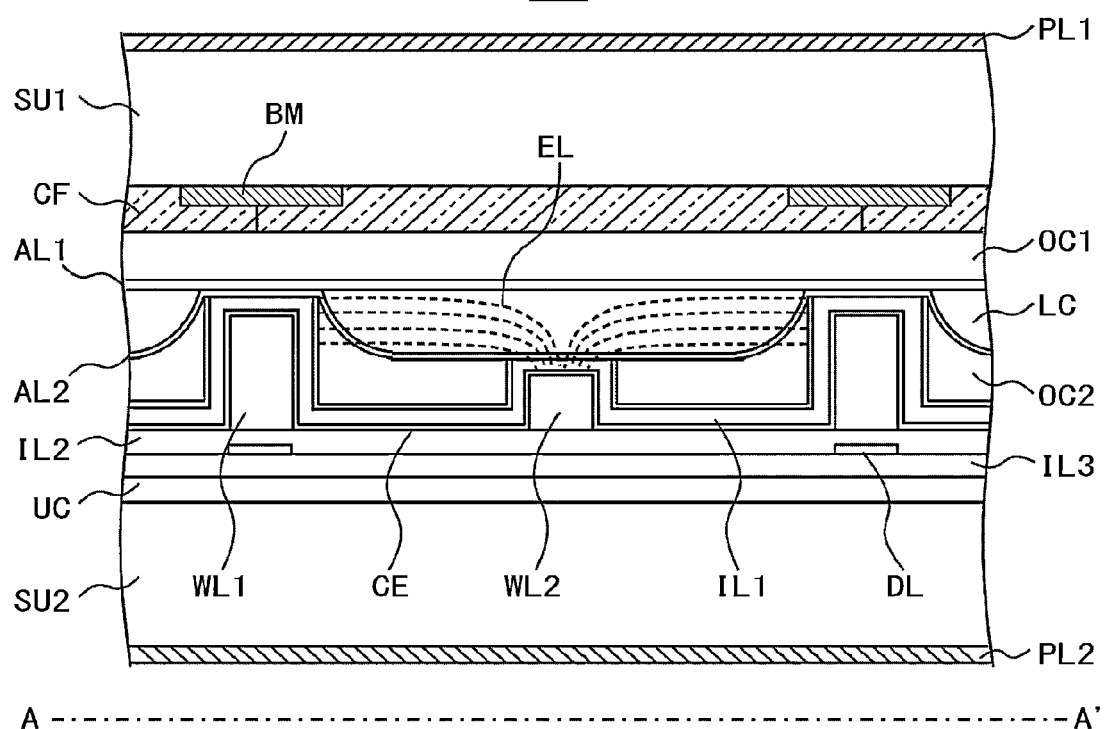
FIG. 18 is an A-A' cross section of a pixel of an LCD device according to Comparative Example 2.

In the LCD device of Example 1, the wall-surface slope angle was configured to be constant within each pixel. As illustrated in FIG. 18, the wall-surface slope angle was decreased near the liquid crystal driver unit LD so that the wall-surface slope angle was the same around all of the liquid crystal driver unit LD, the domain controller unit DC, and the distal end TP. FIG. 6C illustrates the resultant light leakage. As illustrated, the light leakage areas LL are considerably small around any of the liquid crystal driver unit LD, the domain controller unit DC, and the distal end TP, preventing the occurrence of light leakage. However, the transmittance obtained in Comparative Example 2 was lower than that obtained in Example 1.

Unlike Example 1 and Example 2 to be described later, the wall-surface slope angle was configured to be constant within each pixel regardless of the alignment treatment angle. Specifically, the wall-surface slope angle was set to 40 degrees, a relatively small value, even in areas where the alignment treatment angle is small. Because of the angle, the liquid crystal layer LC became thinner near the liquid crystal driver unit LD as illustrated in FIG. 18, which made it impossible to impart a sufficient phase difference to the light passing through the thinner LC layer section. As a result, transmittance decreased although light leakage was prevented.

In Comparative Example 2, the wall-surface slope angle was changed partially by changing the way that the second overcoat OC2 covers the first wall structures WL1. Because an organic photoresist is applied onto the wall surfaces of the first wall structures WL1 to form the second overcoat OC2, which in turn is distributed so as to cover the first wall structures WL1, partially changing the method of etching the photoresist can change the way of the covering. Other methods can also be used to change the wall-surface slope angle (α); for example, the cross-sectional shape of the first wall structures WL1 may be changed.

Within the liquid crystal layer LC, those liquid crystal molecules sandwiched between two liquid crystal driver units LD are driven. Thus, when the wall-surface slope angle is increased near the liquid crystal driver units LD, the thickness of the liquid crystal layer LC becomes uniform even near the liquid crystal driver units LD. Such a uniformly and sufficiently thick liquid crystal layer LC sandwiched between two liquid crystal driver units LD results in reduced light leakage and higher transmittance.

Although the thickness of the liquid crystal layer is smaller near the domain controller units DC, disposing a single domain controller unit DC on a short side of a pixel allows formation of opaque layers of a gate line GL and the like near the domain controller unit DC. These opaque layers constituting a non-aperture section, transmittance will not decline around the domain controller unit DC. It should be noted that two wall surfaces of the domain controller unit DC each exercise domain control on two adjacent pixels. Also, as stated above, the wall-surface slope angle near the liquid crystal driver units LD can be reduced by varying the thickness of the second overcoat OC2 covering the first wall structures WL1. Thus, the slope angle of the electrode of each first wall structure WL1 is constant. This means that reducing the wall-surface slope angle has less influence on the distribution of an electric field, and the domain control functions of the domain controller unit DC can be maintained.

When a single domain controller unit DC is disposed on a short side of a pixel, a contact hole CH will need to be provided between two first wall structures WL1. With this provision, electric force lines can be formed over the contact hole CH and nearby areas, thereby driving liquid crystal molecules LC around the contact hole CH. Thus, in accordance with Example 1, the effective aperture ratio of an LCD device can be improved as well.

With small to medium-sized IPS LCDs with high resolution, display mode efficiency can be improved while the contrast ratio is maintained. IPS LCDs with wall electrodes are advantageous in that AC- and DC-induced image persistence occurs in small areas; thus, they are suitable for medical displays in which image persistence is easy to notice. In accordance with Example 1, the transmittance and contrast ratio of a medical display can also be improved.

Example 2

Figure 10:
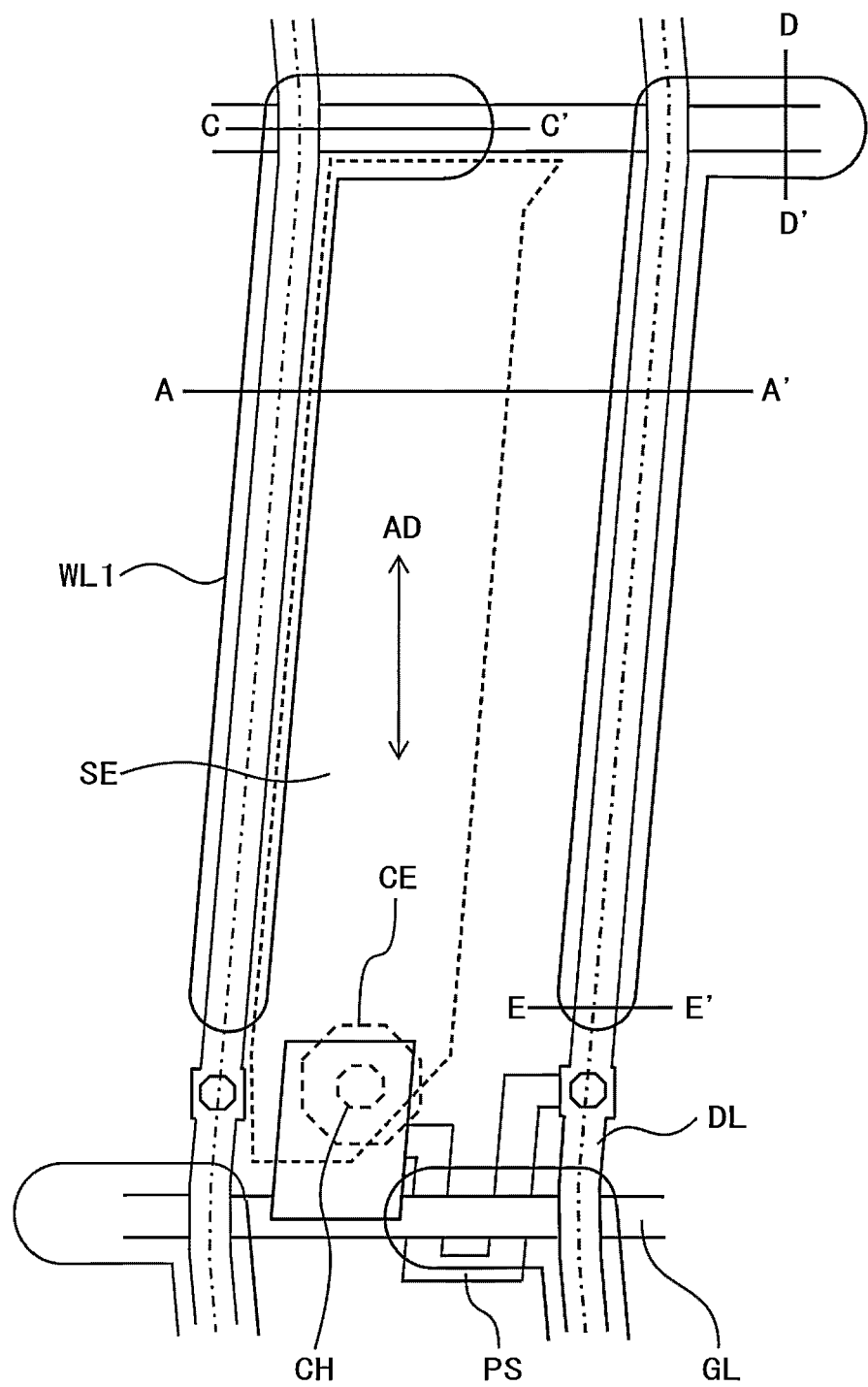
FIG. 10 is a plan view of one pixel of an LCD device according to Example 2 of the invention.
Figure 11:
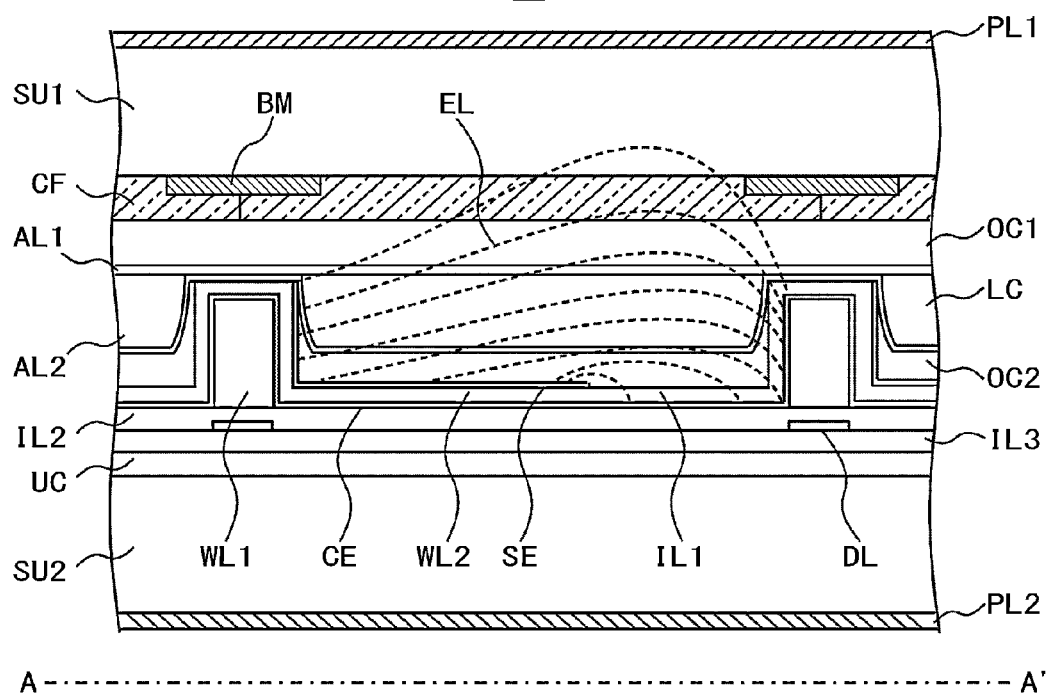
FIG. 11 is a cross section taken along line A-A' of FIG. 10.

FIG. 10 is a plan view of a pixel of an LCD device according to Example 2. FIG. 11 is a cross section taken along line A-A' of FIG. 10, illustrating a central section of the pixel. FIG. 10 illustrates the structure of one of the pixels of the LCD device having wall structures, each of which includes only a first wall structure WL1 of Example 1. The LCD device of Example 2 is structurally simpler than that of Example 1 and suitably applicable to small-sized high-definition pixels. As illustrated in FIG. 10, the pixel is sandwiched between two first wall structures WL1, and a source electrode SE is disposed only on one side of the pixel, the side being closer to one of the first wall structures WL1 and farther away from the other. As a result, electric force lines EL extend as if to traverse the pixel as illustrated in FIG. 11.

Figure 12:
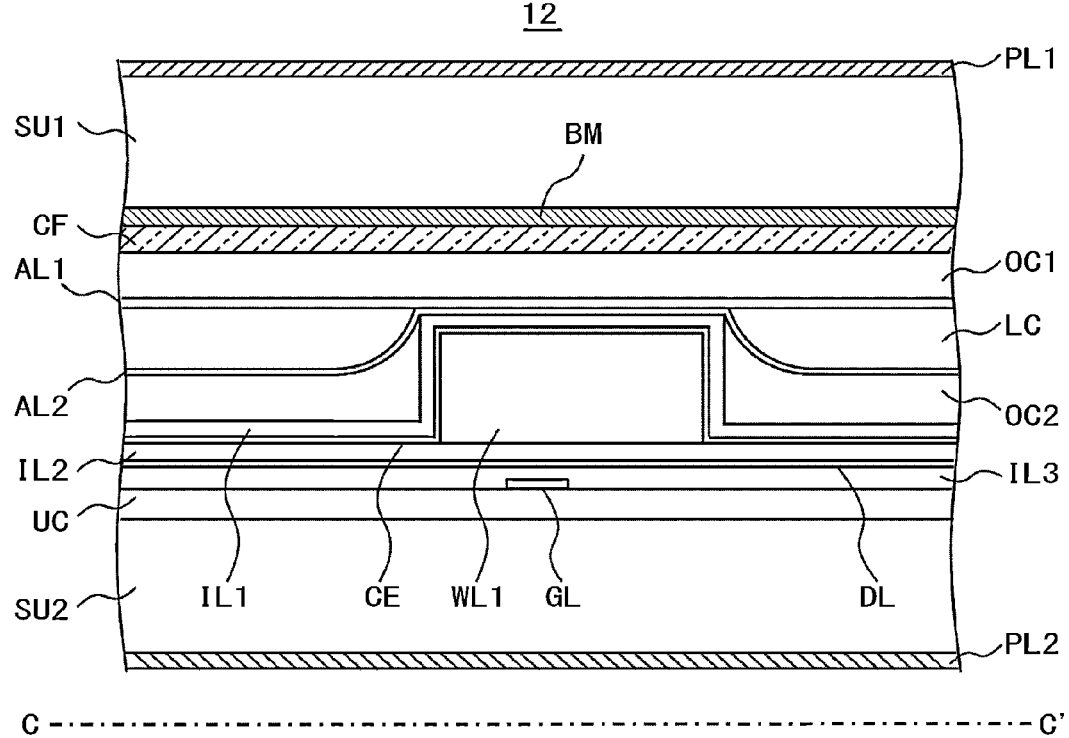
FIG. 12 is a cross section taken along line C-C' of FIG. 10.
Figure 13:
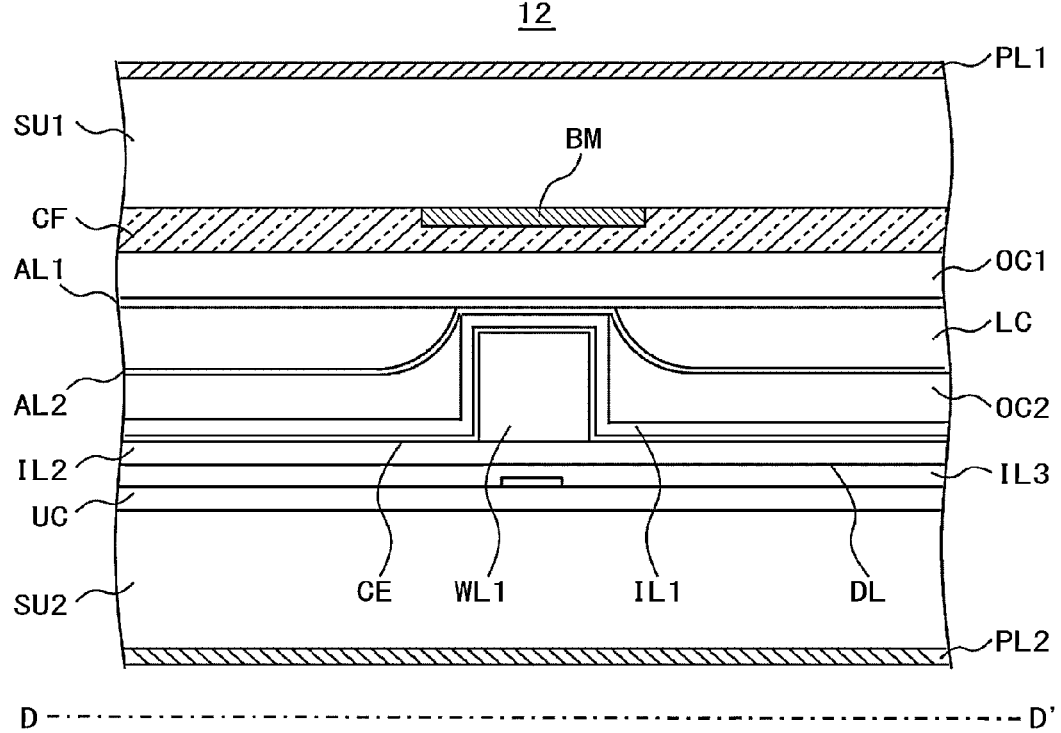
FIG. 13 is a cross section taken along line D-D' of FIG. 10.
Figure 14:
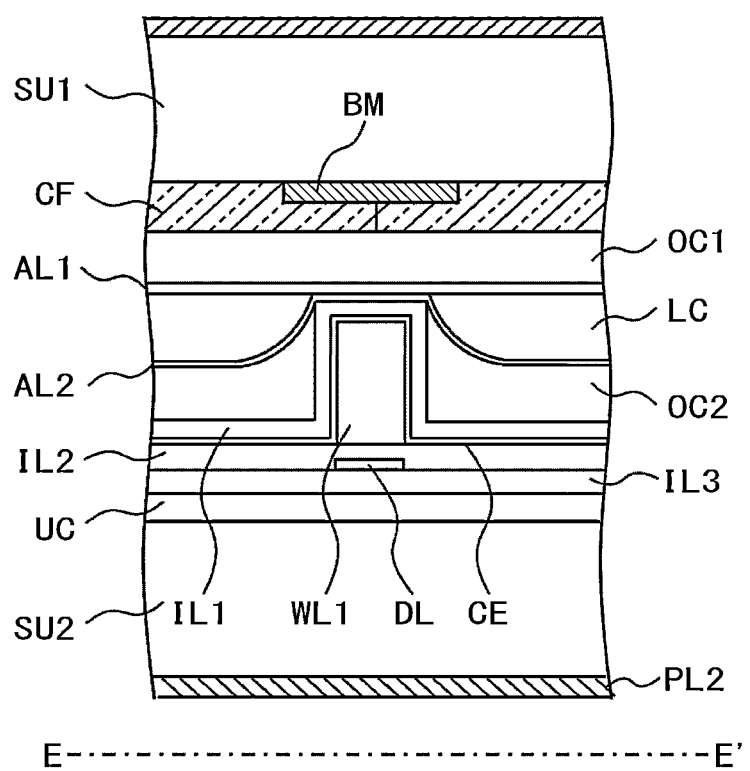
FIG. 14 is a cross section taken along line E-E' of FIG. 10.

FIGS. 11 through 14 illustrate the setting of the wall-surface slope angle adopted in Example 2. FIG. 11 is a cross section illustrating the liquid crystal driver units LD of the first wall structures WL1. Because the alignment treatment direction is constantly 5 degrees, which are a small value, near the liquid crystal driver units LD, the wall-surface slope angle is set to 70 degrees near the units LD. FIGS. 12 and 13 are cross sections illustrating the domain controller unit DC of a first wall structure WL1. The cross section of FIG. 12 is parallel to a drain line DL while that of FIG. 13 is parallel to a gate line GL. Since the alignment treatment angle near the domain controller unit DC has a value distribution in which some angle values are high, the wall-surface slope angle is set to 40 degrees near that unit DC. FIG. 14 is a cross section illustrating the distal end TP of a first wall structure WL1. Similar to the domain controller unit DC, the alignment treatment angle is also high at some points around the distal end TP; thus, the wall-surface slope angle is set to 40 degrees near the distal end TP.

Similar to Example 1, the wall-surface slope angle is set larger at an area where the alignment treatment angle is small and set smaller where the alignment treatment angle is large. Thereby the occurrence of light leakage can be prevented in the pixel structure illustrated in FIGS. 10 and 11. The LCD device of Example 2 also ensures a high contrast ratio, darker black colors, and vivid color representation.

While we have described the invention in detail on the basis of the embodiments and examples, it is apparent that the invention is not limited to the embodiments and Examples disclosed, but can be modified in various forms.

What is claimed is:

1. A display device comprising:
   a plurality of pixels;
   a first wall structure formed along a pixel boundary;
   a first electrode which covers the first wall structure;
   a first insulation film which is formed over the first electrode, and covers a side surface of the first wall structure; and
   a second insulation film between the first electrode and the first insulation film,
   wherein the first wall structure includes a first part formed along a long side of the pixel and a second part formed along a short side of the pixel,
   a thickness of the first insulation film covering the side surface of the first part is thinner than a thickness of the first insulation film covering a side surface of the second part,
   the first wall structure further includes a third part formed on the ling side of the pixel, one end of the first part is connected to the second part, and the third part is formed at the another end of the first part,
   a thickness of the first insulation film covering a side surface of the third part is thicker than the thickness of the first insulation film covering the side surface of the first part,
   the second insulation film covers the first electrode and covers the side surface and the top surface of the first wall structure,
   the first insulation film does not cover the top surface of the first wall structure, and
   the pixel further comprises a second electrode disposed between the first insulation film and the second insulation film, the first insulation film is covered with an alignment film.

2. The display device according to claim 1, further comprising a second wall structure disposed on the same layer of the first wall structure, the second electrode is laminated over a side surface of the second wall structure, and a height of the second wall structure is lower than a height of the first wall structure.

3. A display device comprising:
   a plurality of pixels;
   a first wall structure formed along a pixel boundary;
   a first electrode which covers the first wall structure;
   a first insulation film which is formed over the first electrode, and covers a side surface of the first wall structure; and
   a second insulation film disposed between the first electrode and the first insulation film,
   wherein the first wall structure includes a first part formed along a long side of the pixel and a distal end of the first part,
   a thickness of the first insulation film covering the side surface of the first part is thinner than the thickness of the first insulation film covering a side surface of the distal end,
   the first wall structure further includes a second part formed on the short side of the pixel, and an end opposite to the distal end of the first part is connected to the second part,
   a thickness of the first insulation film covering a side surface of the second part is thicker than the thickness of the first insulation film covering the side surface of the first part,
   the second insulation film covers the first electrode and covers the side surface and a top surface of the first wall structure,
   the first insulation film does not cover the top surface of the first wall structure, and
   the pixel further comprises a second electrode disposed between the first insulation film and the second insulation film, the first insulation film covered with an alignment film.

4. The display device according to claim 3, further comprising a second wall structure disposed on the same layer of the first wall structure, the second electrode is laminated over a side surface of the second wall structure, and a height of the second wall structure is lower than a height of the first wall structure.

* * * * *